United States Patent
Jorgovanovic et al.

(10) Patent No.: US 10,477,294 B1
(45) Date of Patent: Nov. 12, 2019

(54) MULTI-DEVICE AUDIO CAPTURE

(71) Applicant: Amazon Technologies, Inc., Seattle, WA (US)

(72) Inventors: Milos Jorgovanovic, Mountain View, CA (US); Hans Edward Birch-Jensen, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/883,663

(22) Filed: Jan. 30, 2018

(51) Int. Cl.
| | |
|---|---|
| *H04R 1/10* | (2006.01) |
| *H04R 1/08* | (2006.01) |
| *G06F 3/16* | (2006.01) |
| *G10L 15/20* | (2006.01) |
| *G10L 15/08* | (2006.01) |

(52) U.S. Cl.
CPC .......... *H04R 1/1016* (2013.01); *G06F 3/167* (2013.01); *G10L 15/08* (2013.01); *G10L 15/20* (2013.01); *H04R 1/083* (2013.01); *G10L 2015/088* (2013.01); *H04R 2420/07* (2013.01)

(58) Field of Classification Search
CPC .. H04R 1/091; H04R 2420/07; H04R 25/305; H04R 25/70; H04R 25/505; H04R 25/554; H04R 25/552; H04R 2460/03; H04R 2460/13; H04R 2201/003; H04W 76/10; H04S 1/005; H04S 2420/01
USPC ........ 381/1, 2, 23.1, 300, 302, 303, 311, 26, 381/56, 58, 61, 86, 92, 93, 94.1, 375, 381/370, 380
See application file for complete search history.

(56) References Cited

U.S. PATENT DOCUMENTS

| | | | | |
|---|---|---|---|---|
| 9,398,379 | B2* | 7/2016 | Aubreville | H04R 25/40 |
| 9,942,669 | B2* | 4/2018 | Nikles | H04R 25/305 |
| 2005/0203998 | A1* | 9/2005 | Kinnunen | G10L 25/78 |
| | | | | 709/204 |
| 2015/0341724 | A1* | 11/2015 | Pedersen | H04R 25/552 |
| | | | | 381/300 |
| 2016/0219358 | A1* | 7/2016 | Shaffer | H04R 1/1041 |
| 2016/0249140 | A1* | 8/2016 | Nikles | H04R 25/305 |

(Continued)

OTHER PUBLICATIONS

The Examiner's attention is hereby drawn to the specification and file history of co-pending U.S. Appl. No. 16/142,992 entitled "Beamforming Using an In-Ear Audio Device", filed Sep. 26, 2018, which may contain information relevant to the present application.

*Primary Examiner* — Binh Kien Tieu
(74) *Attorney, Agent, or Firm* — Pierce Atwood LLP

(57) ABSTRACT

A system and method includes a first device (e.g., a primary or primary earbud) that detects first audio corresponding to an utterance and a second device (e.g., a secondary or secondary earbud) that detects second audio corresponding to the utterance. The first device determines first audio data corresponding to the first audio and the second device determines second audio data corresponding to the second audio. The first device determines a first quality metric corresponding to the first audio data, and the second device determines a second quality metric corresponding to the second audio data. The second device transmits the second quality metric to first device, which compares it to the first quality metric. If the first device determines the second quality metric is better, it transmits the second audio data to a third device (e.g., a smartphone) and enters a power-saving state.

20 Claims, 14 Drawing Sheets

(56) References Cited

U.S. PATENT DOCUMENTS

| | | | |
|---|---|---|---|
| 2017/0215011 A1* | 7/2017 | Goldstein | H04R 25/305 |
| 2018/0084331 A1* | 3/2018 | Gurunathan | H04R 1/1083 |
| 2018/0098161 A1* | 4/2018 | Popovski | H04R 25/552 |
| 2018/0234777 A1* | 8/2018 | Roeck | G10L 19/22 |
| 2018/0279038 A1* | 9/2018 | Boesen | H04R 1/1016 |

* cited by examiner

MULTI-DEVICE AUDIO CAPTURE

BACKGROUND

Speech-recognition systems have progressed to the point at which humans are able to interact with computing devices using their voices. Such systems employ techniques to detect when speech is occurring and to identify the words spoken by a human user based on the received audio input. Voice-activity detection, speech recognition, and natural-language understanding processing techniques enable speech-based user control of a computing device to perform tasks based on the user's spoken commands. The combination of voice-activity detection, speech recognition, and/or natural-language understanding processing techniques is referred to herein as speech processing. Speech processing may also involve converting a user's speech into text data, which may then be provided to various text-based software applications. Speech processing may be used by wired or wireless headphones, computers, hand-held devices, telephone computer systems, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
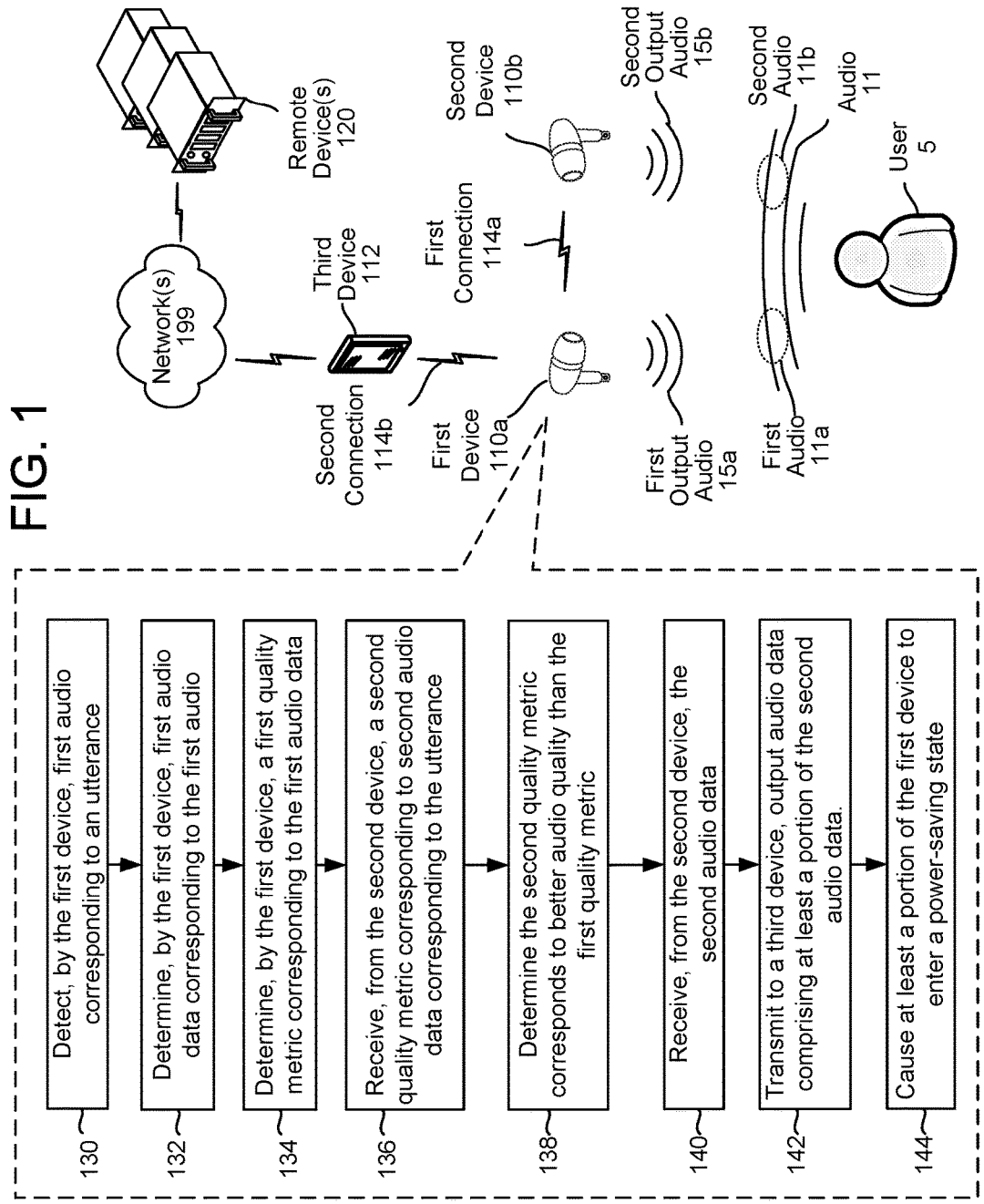
FIG. 1 illustrates a system configured to capture audio using a pair of connected devices according to embodiments of the present disclosure.

Some electronic devices may operate using a voice based user interface. That is, certain electronic devices may include an audio-based input/output interface. A user may interact with such a device—which may be, for example, a smartphone, tablet, computer, or other speech-controlled device—partially or exclusively using his or her voice and ears. Examples of voice based interactions may include telephone calls, audio messaging, video messaging, search queries, weather forecast requests, navigation requests, or other such interactions. The device may include one or more microphones for capturing voice input and hardware and/or software for converting the voice input into audio data. As explained in greater detail below, the device may further include hardware and/or software for analyzing the audio data and determining commands and requests therein and/or may send the audio data to a remote device for such analysis. The device may include an audio output device, such as a speaker, for outputting audio that responds to and/or prompts for the voice input.

The device may monitor ambient audio to determine whether speech is present in the audio using, for example, voice-activity detection (VAD). Once the device detects speech in the audio, it may detect if a wakeword is represented in the audio. This wakeword-detection process may also be referred to as keyword detection, with the wakeword being a specific example of a keyword. To determine whether a wakeword is spoken, the device may compare captured audio data to a stored wakeword signature. The wakeword signature may correspond to a built-in word or phrase or may be programmed by the user. When the device detects a wakeword, the device may "wake" and send captured audio data to a remote system for speech processing and a determination of output content responsive to the received audio.

Automatic speech recognition (ASR) is a field of computer science, artificial intelligence, and linguistics concerned with transforming audio data associated with speech into text data representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Thus, a spoken-language processing system may include an ASR component that receives audio input of a user utterance and generates one or more likely transcriptions of the utterance and may also include a NLU component that receives textual input, such as a transcription of a user utterance, and determines the meaning of the text in a way that can be acted upon, such as by a computer application.

A speech-processing system may be configured as a relatively self-contained system in which a single device captures audio, performs speech processing, and executes a command corresponding to the input speech. Alternatively, a speech processing system may be configured as a distributed system in which a number of different devices combine to capture audio of a spoken utterance, perform speech processing, and execute a command corresponding to the utterance. Although the present application describes a distributed system, the teachings of the present application may apply to any system configuration.

ASR and NLU can be computationally expensive; significant computing resources may be needed to perform ASR and NLU processing within a reasonable time frame. Because of this expense, a distributed computing environment may be used when performing speech processing. A typical such distributed environment may involve one or more local devices having one or more microphones being configured to capture sounds from a user speaking and convert those sounds into an audio signal or other types of data. The audio signal/data may then be sent to one or more downstream remote devices for further processing, such as converting the audio signal into an ultimate command. For example, one or more servers may combine to perform ASR, one or more servers may combine to perform NLU, and so on. The command may then be executed by one or a combination of remote and local devices depending on the command itself.

Use of the above-described speech-controlled device may, at times, be difficult or impossible. Sometimes, such as while exercising, working, or driving, the user's hands may be occupied, and the user may not be able to hold the device in such a fashion as to effectively interact with the device's audio interface. Other times, the level of ambient noise may be too high for the device to accurately detect speech from the user or too high for the user to understand audio output from the device. In these situations, the user may prefer to connect headphones to the device. As the term is used herein, "headphones" may refer to any hands-free, wearable audio input/output device and includes headsets, earphones, earbuds, or any similar device. For added convenience, the user may choose to use wireless headphones, which communicate with the device—and optionally each other—via a wireless connection, such as Bluetooth, Wi-Fi, near-field magnetic induction (NFMI), Long Term Evolution (LTE), or any other type of wireless connection.

In the present disclosure, for clarity, headphone components that communicate with both a device and each other are referred to as "earbuds," but the term "earbud" does not limit the present disclosure to any particular type of wired or wireless headphones. The present disclosure may further differentiate between a "right earbud," meaning a headphone component disposed near a right ear of a user, and a "left earbud," meaning a headphone component disposed near a left ear of a user. A "primary" earbud communicates with both a "secondary" earbud, using a first wired or wireless connection (such as a wired audio connection, Bluetooth or NFMI); the primary earbud further communicates with a device (such as a smartphone, Wi-Fi router, or cellular tower) using a second connection (such as a wired audio connection, Bluetooth, Wi-Fi, or LTE or other cellular protocol). The secondary earbud communicates only with the primary earbud using the first connection. The primary and secondary earbuds may include similar hardware and software; in other instances, the secondary earbud contains only a subset of the hardware/software included in the primary earbud and lacks, for example, circuitry to communicate over the second wireless connection. If the primary and secondary earbuds include similar hardware and software, they may trade the roles of primary and secondary prior to or during operation. In the present disclosure, the primary earbud may be referred to as the "first device," the secondary earbud may be referred to as the "second device," and the smartphone, router, cellular tower, or other device may be referred to as the "user device" or "third device." The first, second, and/or third devices may communicate over a network with one or more server devices, which may be referred to as "remote device(s)."

Typically, if a headphone assembly includes a microphone, it is disposed somewhere on the headphone assembly near the user's mouth. Headset-style headphones may include a frame element specifically for bringing the microphone directly in front of the user's mouth; earbuds may include a frame element to bring the microphone in front of the user's ear; and corded headphones may dispose the microphone on the cord. In any case, however, the microphone is disposed in a static position relative to the user's mouth and its position is not readily adjustable by the user without use of the user's hands or other such physical input. Thus, the microphone may be subject to static and/or dynamic ambient noise due to, for example, other speech, wind, road noise, or the like. The user may not be able to move his or her head or body to shield the microphone from the noise, and his or her hands may be occupied with another task and may thus not be able to adjust the position of the microphone.

The present disclosure offers a system and method for improved detection of audio corresponding to an utterance of the user. One or more microphones is disposed on each of left and right earbuds. Both the first device, i.e., the primary earbud, and the second device, i.e., the secondary earbud, monitor ambient audio for an utterance using, for example, VAD. As explained further below, the earbuds may perform a varying degree of processing of the audio; they may, for example, convert the audio into audio data via audio processing, compute a quality metric corresponding to the audio data, monitor the audio data for a wakeword, and/or other such processing. In some embodiments, the primary earbud computes a first quality metric corresponding to first audio data, and the secondary earbud computes a second quality metric corresponding to second audio data. The primary earbud compares the quality metrics and transmits the audio data corresponding to the better audio; the other audio is unused. As explained in greater detail below, the unused earbud may wholly or partially power down (i.e., enter a power-saving mode) or may continue to monitor the audio; if the quality of the audio monitored by the unused earbud improves to the point of being better than the used earbud, the primary earbud may switch the audio to the formerly unused earbud.

FIG. 1 illustrates a system for detecting audio 11 using a first device 110a (i.e., a primary earbud) and a second device 110b (i.e., a secondary earbud). The first device 110a and the second device 110b communicate using a first connection 114a, which may be a wired, Bluetooth, NFMI, or similar connection. The first device 110a communicates with a third device 112, which may be a user device such as a smartphone, router, or cellular tower, using a second connection 114b, which may be a wired, Bluetooth, Wi-Fi, LTE, or similar connection. The third device 112 communicates with one or more remote device(s) 120, which may be server devices, via a network 199, which may be the Internet, a wide- or local-area network, or any other network. The first device 110a may output first output audio 15a, and the second device 110b may output second output audio 15b. Due to having different physical locations (i.e., being disposed on opposite sides of a user's head), the first device 110a and second device 110b may capture different versions of input audio 11 from a user 5; the first device 110a may capture first audio 11a, and the second device 110b may capture second audio 11b. The first audio 11a and the second audio 11b may differ from the input audio 11 in having different amplitudes, frequencies, compositions, and/or time delays.

In various embodiments, and as explained in greater detail below, the first device 110a detects (130) first audio 11a corresponding to an utterance in audio 11 output by a user 5; the second device 110b detects second audio 11b corresponding to the utterance. The first device 110a determines (132) first audio data corresponding to the first audio 11a; the second device 110b determines second audio data corresponding to the second audio 11b. The first device 110a determines (134) a first quality metric corresponding to the first audio data; the second device 110b determines a second quality metric corresponding to the second audio 11b. The first device 110a receives (136), from the second device 110b, the second quality metric. The first device 110a compares the quality metrics and determines (138) that the second quality metric corresponds to better audio quality than the first quality metric. The first device 110a receives (140), from the second device 110b, the second audio data. The first device 110a transmits (142), to the third device 112, output audio data that includes at least a portion of the second audio data. At least a portion of the first device 110a, such as a voice-activity detection component and/or a wakeword detection component, is caused (144) to enter a power-saving state.

Figure 2:
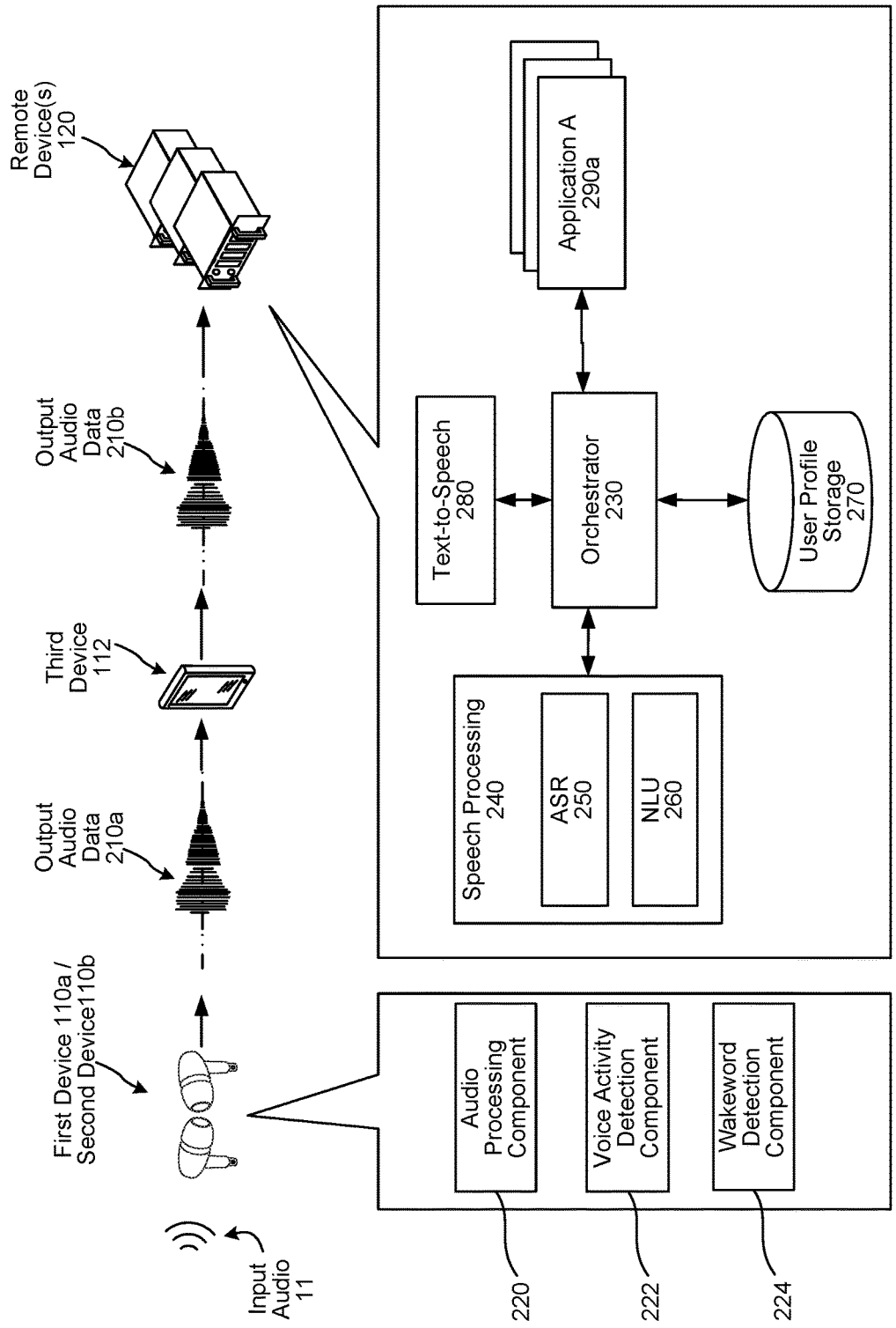
FIG. 2 illustrates a system configured to use a voice interface according to embodiments of the present disclosure.

As indicated above, the system of FIG. 1 may operate using various speech processing and other components as described in FIG. 2. The various components may be located on the same or on different physical devices. Communication between various components may occur directly or across a network(s) 199. Below is a discussion of those components, followed by a further discussion of capturing audio.

The devices 110a/110b may each include an audio-processing component 220, a voice-activity detection component 222, a wakeword detection component 224, and/or other components. The devices 110a/110b may receive input audio 11 using an audio capture component, such as a microphone or microphone array, as explained in more detail with reference to FIGS. 3A and 3B. The audio-processing component 220 may receive the captured audio and determine audio data based thereon. In some embodiments, the audio-processing component 220 includes a hardware and/or software analog-to-digital converter that converts the analog input audio, as captured by the microphone, into a digital audio signal for inclusion in the audio data. The analog-to-digital converter may sample the input audio 11 at any of a variety of different sample rates and amplifications. The audio-processing component 220 may further include noise reduction, automatic gain control, or any other such audio processing hardware or software. The audio-processing component 220 may include an encryption and/or compression component to encrypt and/or compress the audio data; the encryption and/or compression may conform to an industry standard, such as Bluetooth.

In some embodiments, the audio-processing component 220 includes hardware and/or software to determine a quality metric based on the audio data. The quality metric may be, for example, a signal-to-noise ratio (SNR) of the audio data, a signal-to-interference-plus-noise ratio (SINR) of the audio data, a perceptual evaluation of audio quality (PEAQ) of the audio data, a signal strength of the audio data, or any other such metric. The audio-processing component 220 may compute the quality metric continuously, at regular intervals, upon detection of input audio, after the voice-activity detection component 222 detects speech in the input audio, or at any other time.

The voice-activity detection component 222 may monitor the input audio 11 to determine whether speech is present. For example, the voice-activity detection component 222 may analyze various quantitative aspects of the audio data, such as, for example, the spectral slope between one or more frames of the audio, the energy levels of the audio in one or more spectral bands, the signal-to-noise ratios of the audio in one or more spectral bands, and/or other quantitative aspects. In some instances, the voice-activity detection component 222 may use a trained classifier configured to distinguish speech from background noise. The classifier may be implemented using linear classifiers, support vector machines, and/or decision trees. The voice-activity detection component 222 may apply techniques using, for example, a Hidden Markov Model (HMM) or a Gaussian Mixture Model (GMM) to compare the audio data to one or more acoustic models in speech storage; the acoustic models may include models corresponding to speech, noise (e.g., environmental noise or background noise), and/or silence. The voice-activity detection component 222 may "trigger" when it determines that speech is present in the audio and may transmit notification of the trigger to, for example, the audio-processing component 220, the wakeword detection component 224, another device 110a/110b, and/or the third device 112.

The wakeword detection component 224 may process input the audio data—continuously, at intervals, and/or in response to a notification of the triggering of the VAD component—to determine if a keyword (e.g., a wakeword) is present in the audio data. In some embodiments, however, such as telephone calls or other such communications, no wakeword is needed or expected. Following detection of a wakeword, the devices 110a/110b may output audio data 210a, which may include at least a portion of the audio data, to the third device 112, which may in turn send corresponding output audio data 210b to the remote device(s) 120. The output audio data 210a may at least partially correspond to input audio 11 captured subsequent to input audio corresponding to the wakeword. That is, the input audio data 201a may correspond to a spoken command that follows a spoken wakeword and optionally includes the spoken wakeword.

The wakeword detection component 224 may compare audio data to stored models or data to detect a wakeword. One approach for wakeword detection applies general large-vocabulary continuous speech-recognition (LVCSR) systems to decode the audio signals, with wakeword searching conducted in the resulting lattices or confusion networks. LVCSR decoding may, however, require relatively high computational resources. Another approach for wakeword detection builds HMMs for each wakeword and non-wakeword speech signals respectively. The non-wakeword speech includes other spoken words, background noise, etc. There may be one or more HMMs built to model the non-wakeword speech characteristics, which are named filler models. Viterbi decoding may be used to search the best path in the decoding graph, and the decoding output may be further processed to make the decision on keyword presence. This approach may be extended to include discriminative information by incorporating a hybrid DNN-HMM decoding framework. In another example, the wakeword detection component 224 may be built on deep neural network (DNN)/recursive neural network (RNN) structures without using a HMM. Such a wakeword detection component 224 may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Upon receipt by the remote device(s) 120, the output audio data 210b or other data may be sent to an orchestrator component 230. The orchestrator component 230 may include memory and logic that enables it to transmit and receive various pieces and forms of data to various components of the system.

The orchestrator component 230 may send the output audio data 210b to a speech-processing component 240. An ASR component 250 of the speech processing component 240 transcribes the output audio data 210b into text data representing one more hypotheses representing a spoken command represented in the output audio data 210b. The ASR component 250 may interpret the spoken command represented in the output audio data 210b based on a similarity between the spoken command and pre-established language models. For example, the ASR component 250 may compare the output audio data 210b with models for sounds (e.g., subword units, such as phonemes, senons, etc.) and sequences of sounds to identify words that match the sequence of sounds corresponding to the spoken command represented in the output audio data 210b. The ASR component 250 may send the text data generated thereby to an NLU component 260 of the speech processing component 240. The text data sent from the ASR component 250 to the NLU component 260 may include a top-scoring hypothesis or may include an N-best list including multiple hypotheses. An N-best list may additionally include a score associated with each hypothesis represented therein. Each score may indicate a confidence of ASR processing performed with respect to the hypothesis with which it is associated. While FIG. 2 illustrates components of the remote device(s) 120 communicating via the orchestrator component 230, one skilled in the art will appreciated that various components of the remote device(s) 120 may communication directly.

The NLU component 260 attempts to make a semantic interpretation of the phrases or statements represented in the text data input therein. That is, the NLU component 260 determines one or more meanings associated with the phrases or statements represented in the text data based on individual words represented in the text data. The NLU component 260 may determine an intent of the command represented in the text data (e.g., an action that a user desires be performed) and/or pertinent pieces of information in the text data that allow a device (e.g., the devices 110a/110b, the remote device(s) 120, etc.) to execute the intent. For example, if the text data corresponds to "call mom," the NLU component 260 may determine that the user intended to activate a telephone application on his/her device and to initiate a call with a contact matching the entity "mom."

The remote device(s) 120 may also include or communicate with various applications 290. It should be appreciated that the remote device(s) 120 may additionally or alternatively communicate with one or more application servers executing third-party applications. The applications 290 may include, for example, shopping applications, mapping applications, weather applications, taxi or car-sharing applications, or the like. In some embodiments, the applications 290 include communications applications such as telephone applications, voice-over-IP applications, or similar applications; if these applications are used, the orchestrator component may send the output audio data 210a there and not to the speech-processing component 240.

An "application," as used herein, may be considered synonymous with a "skill." A skill may be software akin to an application. That is, a skill may enable the remote device(s) 120 and/or the application server(s) to execute specific functionality in order to provide output data to the user 5. The system may be configured with more than one skill. A skill may either be executed by the remote device(s) 120 or merely associated with the remote device(s) 120 (i.e., one executed by the application server(s)).

The remote device(s) 120 may include a TTS component 280 that generates audio data from text data using one or more different methods. In one method of synthesis called unit selection, the TTS component 280 matches text data against a database of recorded speech. The TTS component 280 may select matching units of recorded speech matching the text data and concatenates the units together to form audio data. In another method of synthesis, called parametric synthesis, the TTS component 280 varies parameters such as frequency, volume, and noise to create audio data including an artificial speech waveform. Parametric synthesis uses a computerized voice generator, sometimes called a vocoder.

The remote device(s) 120 may also include or communicate with user profile storage 270 which may include information related to one or more user profiles corresponding to a user that communicates with the speech processing system. A user profile may include user specific data (such as preferences, etc.) that may be used to interpret and/or execute spoken commands. The user specific data may also be used to configure VAD/wakeword detection processing (such as that performed by the first device 110a and/or the second device 110b) to be specific for a particular user.

Figure 3:
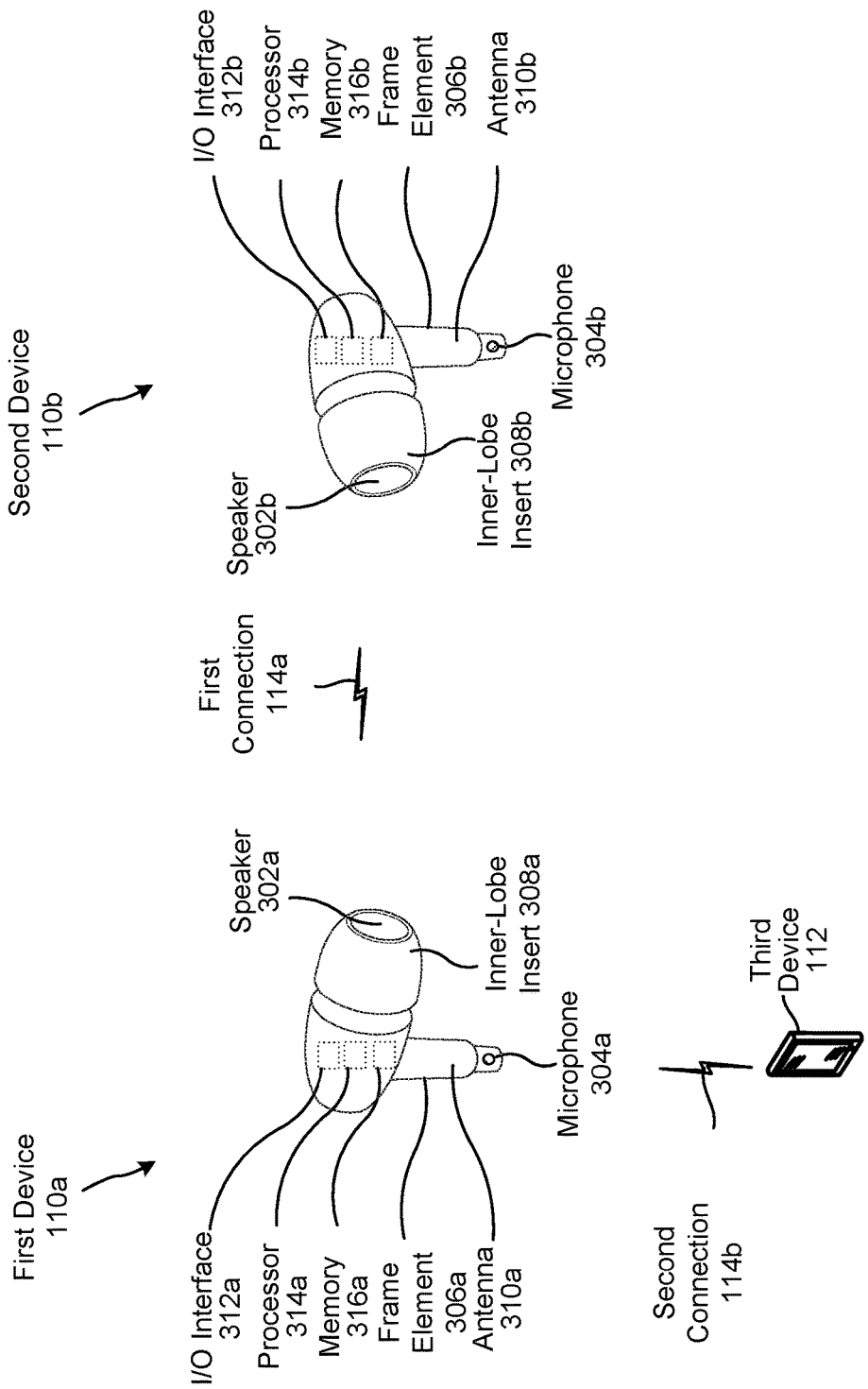
FIGS. 3A and 3B are conceptual diagrams of components of an audio capture system according to embodiments of the present disclosure.

FIGS. 3A and 3B illustrate additional features of an embodiment of the first device 110a and second device 110b, respectively. As shown, the first device 110a and second device 110b have similar features; in other embodiments, as noted above, the second device 110b (i.e., the secondary device) may have only a subset of the features of the first device 110a. As illustrated, the first device 110a and second device 110b are depicted as wireless earbuds having an over-the-ear frame element and an inner-lobe insert; as mentioned above, however, the present disclosure is not limited to only wireless earbuds, and any wearable audio input/output system, such as a headset, over-the-ear headphones, or other such systems, is within the scope of the present disclosure.

The devices 110a/110b include a speaker 302a/302b and a microphone 304a/304b. The speaker 302a/302b may be any type of speaker, such as an electrodynamic speaker, electrostatic speaker, diaphragm speaker, or piezoelectric speaker; the microphone 304a/304b may be any type of microphone, such as a piezoelectric or MEMS microphone. Each device 110a/110b may include one or more microphones 304a/304b.

The speaker 302a/302b and microphone 304a/304b may be mounted on, disposed on, or otherwise connected to a frame element 306a/306b. As illustrated, the frame element 306a/306b is shaped to an over-the-ear shape such that the weight of the devices 110a/110b is borne by the user's ear. In other embodiments, the frame element 306a/306b is a housing for the speaker 302a/302b and does not include an over-the-ear shape. The devices 110a/110b further include an inner-lobe insert 308a/308b that may bring the speaker 302a/302b closer to the eardrum of the user and/or block some ambient noise.

Figure 4:
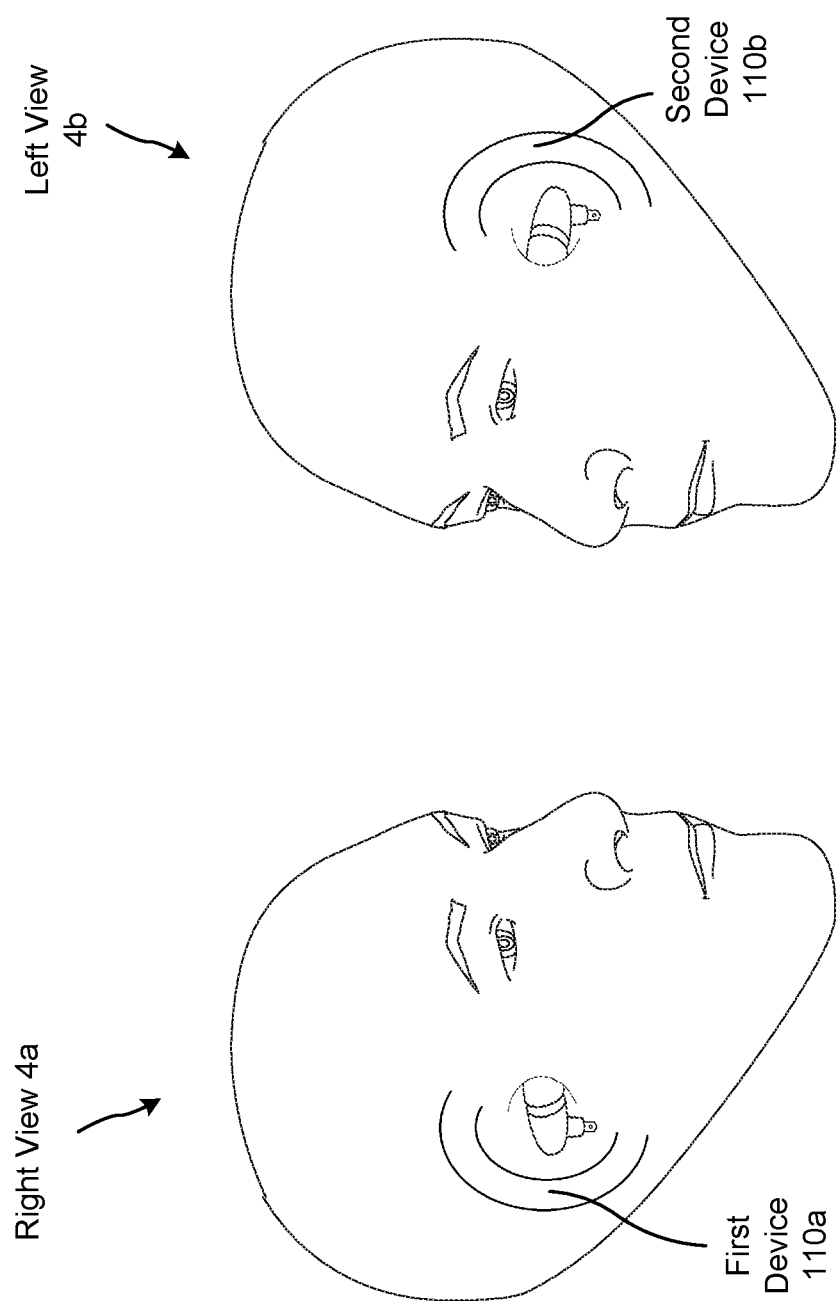
FIG. 4 is a conceptual diagram of in-situ components of an audio capture system according to embodiments of the present disclosure.

One or more additional components may be disposed in or on the frame element 306a/306b. One or more antennas 310a/310b may be used to transmit and/or receive wireless signals over the first connection 114a and/or second connection 114b; an I/O interface 312a/312b contains software and hardware to control the antennas 310a/310b and transmit signals to and from other components. A processor 314a/314b may be used to execute instructions in a memory 316a/316b; the memory 316a/316b may include volatile memory (e.g., random-access memory) and/or non-volatile memory or storage (e.g., flash memory). The instructions may correspond to the audio-processing component 220, voice-activity detection component 222, wakeword detection component 224, and/or other components discussed above. FIG. 4 illustrates a right view 4a and a left view 4b of the head of a user of the first device 110a and the second device 110b.

Figure 5:
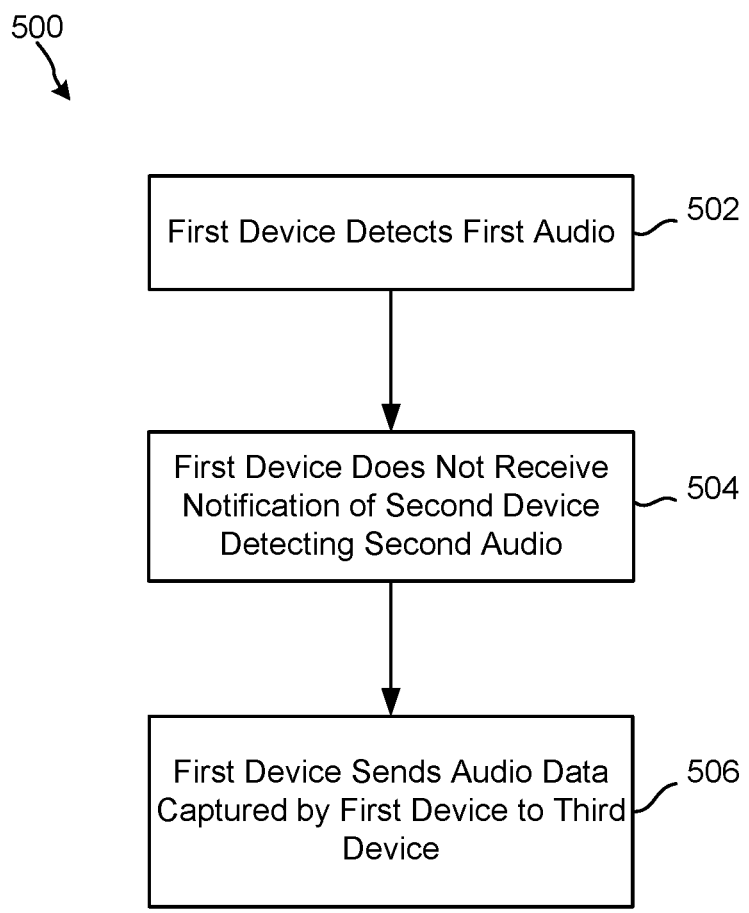
FIGS. 5-10 illustrate process flows for capturing audio according to embodiments of the present disclosure.
Figure 6:
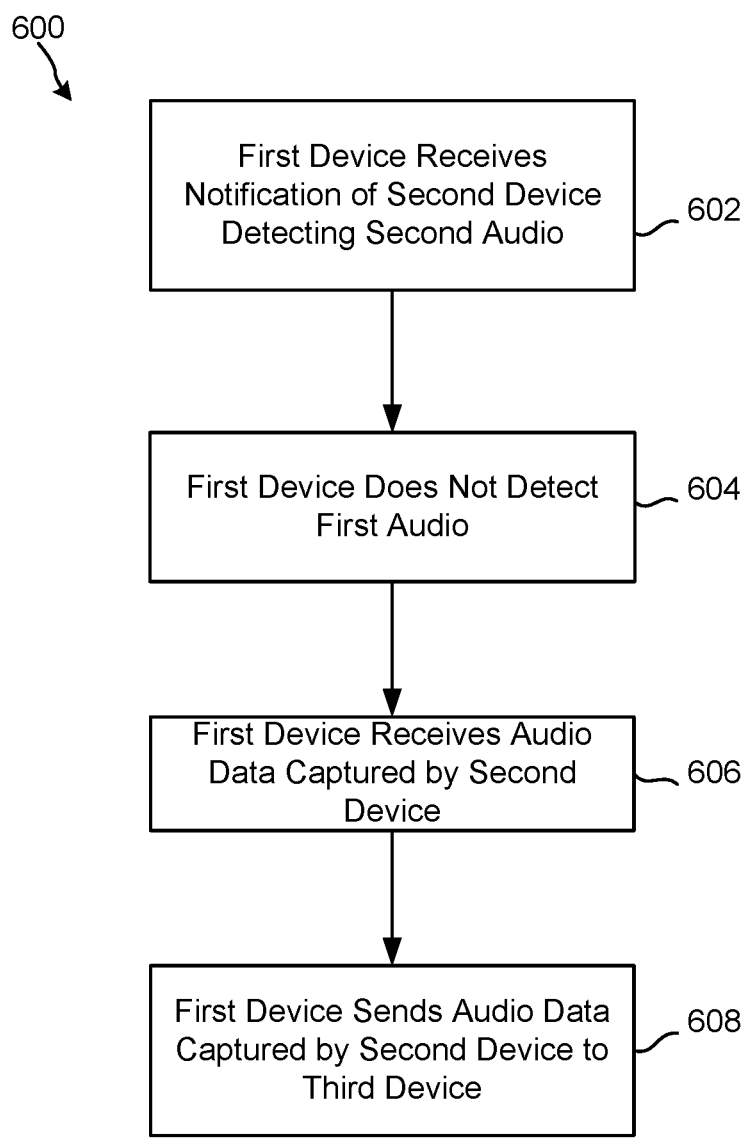
Figure 7:
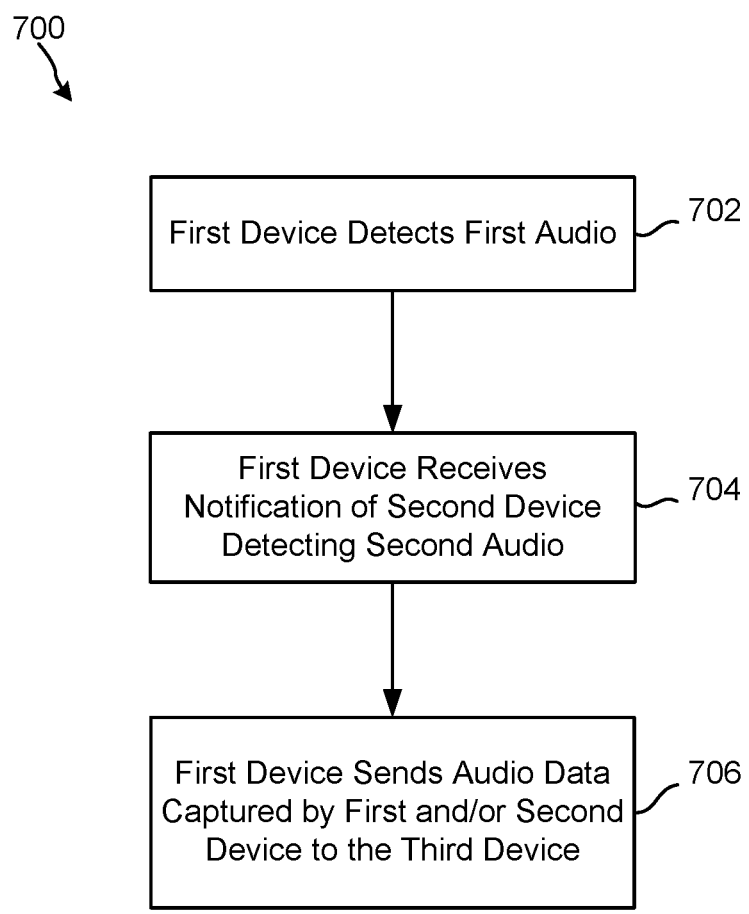
Figure 8:
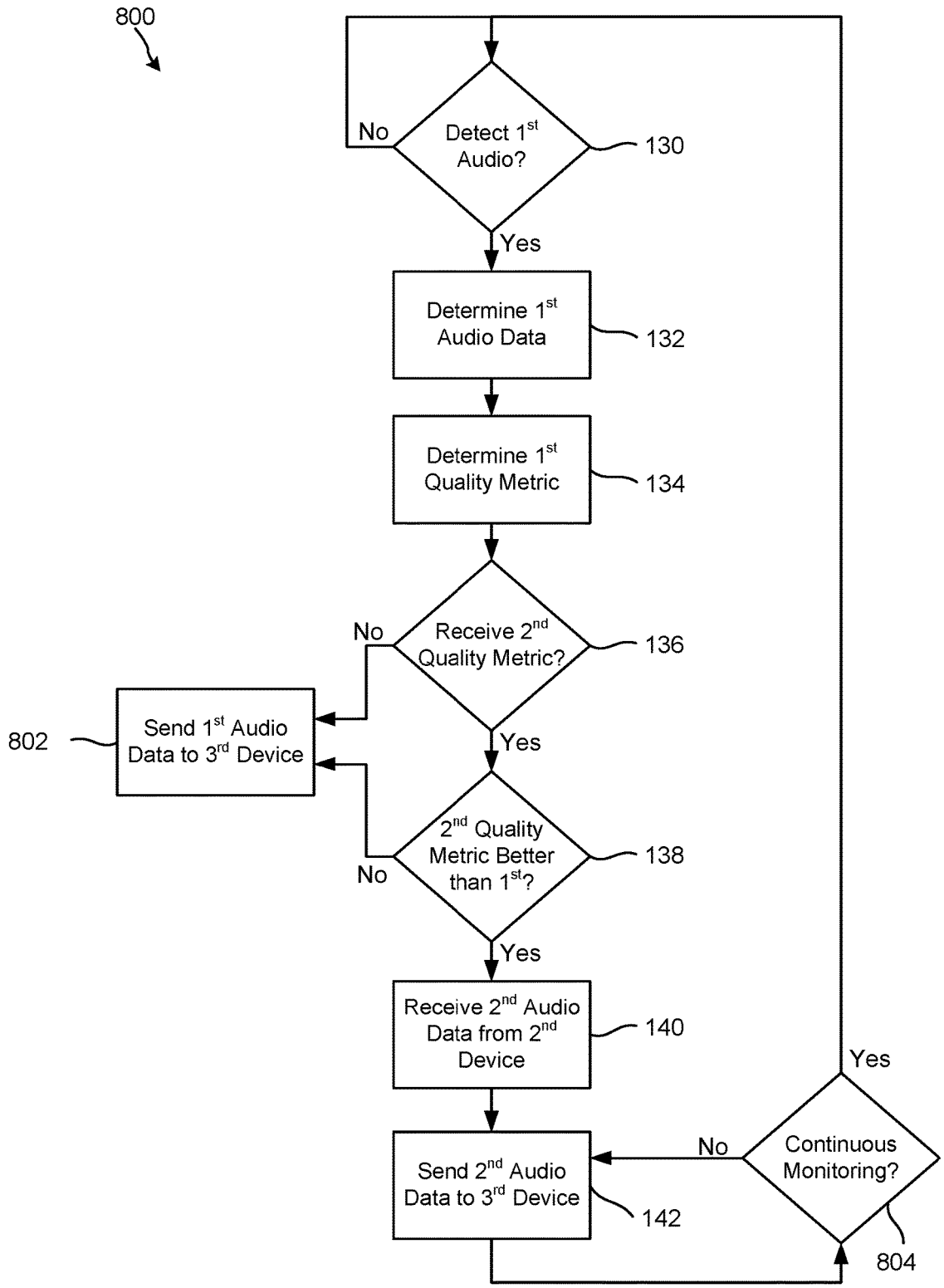
Figure 9:
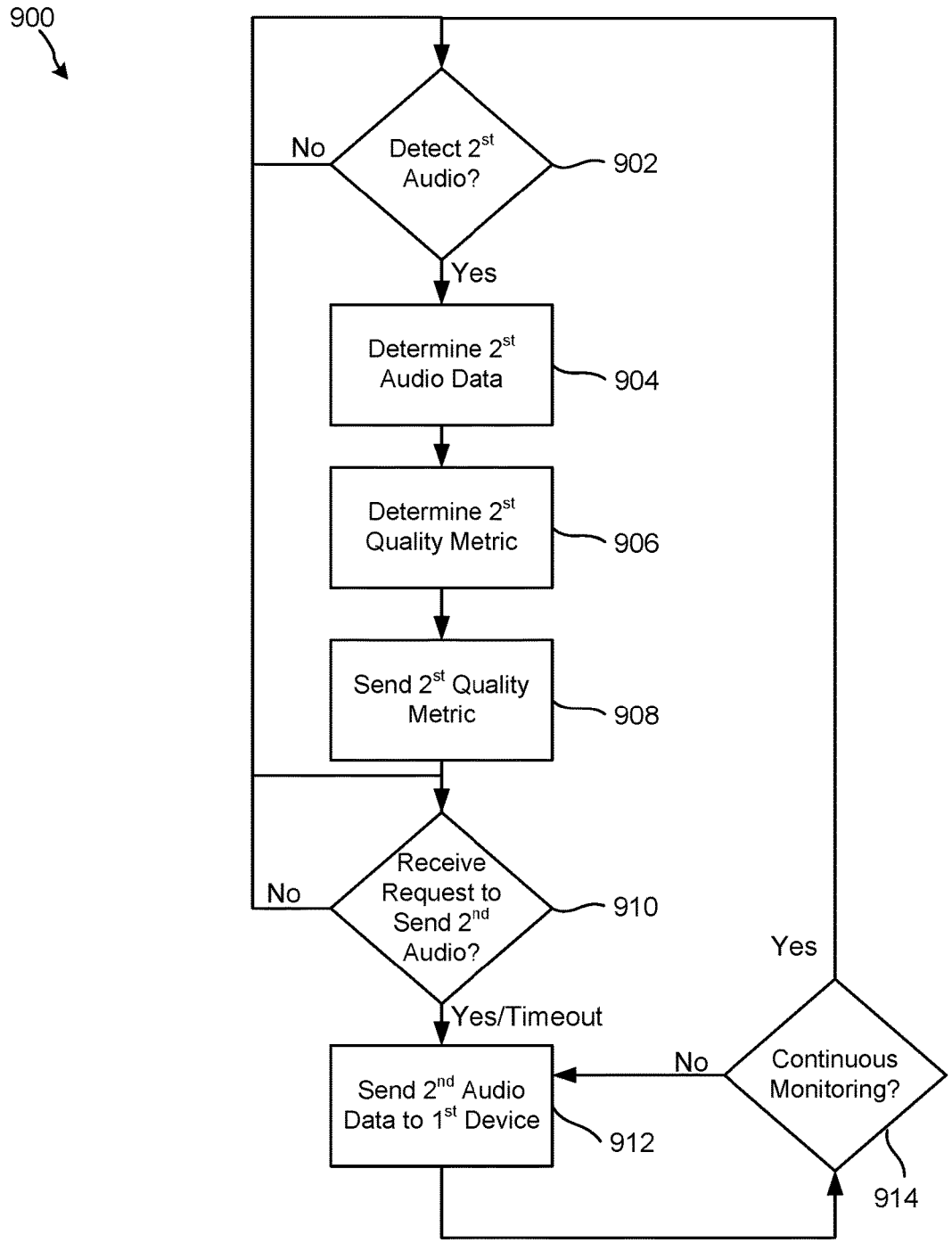
Figure 10:
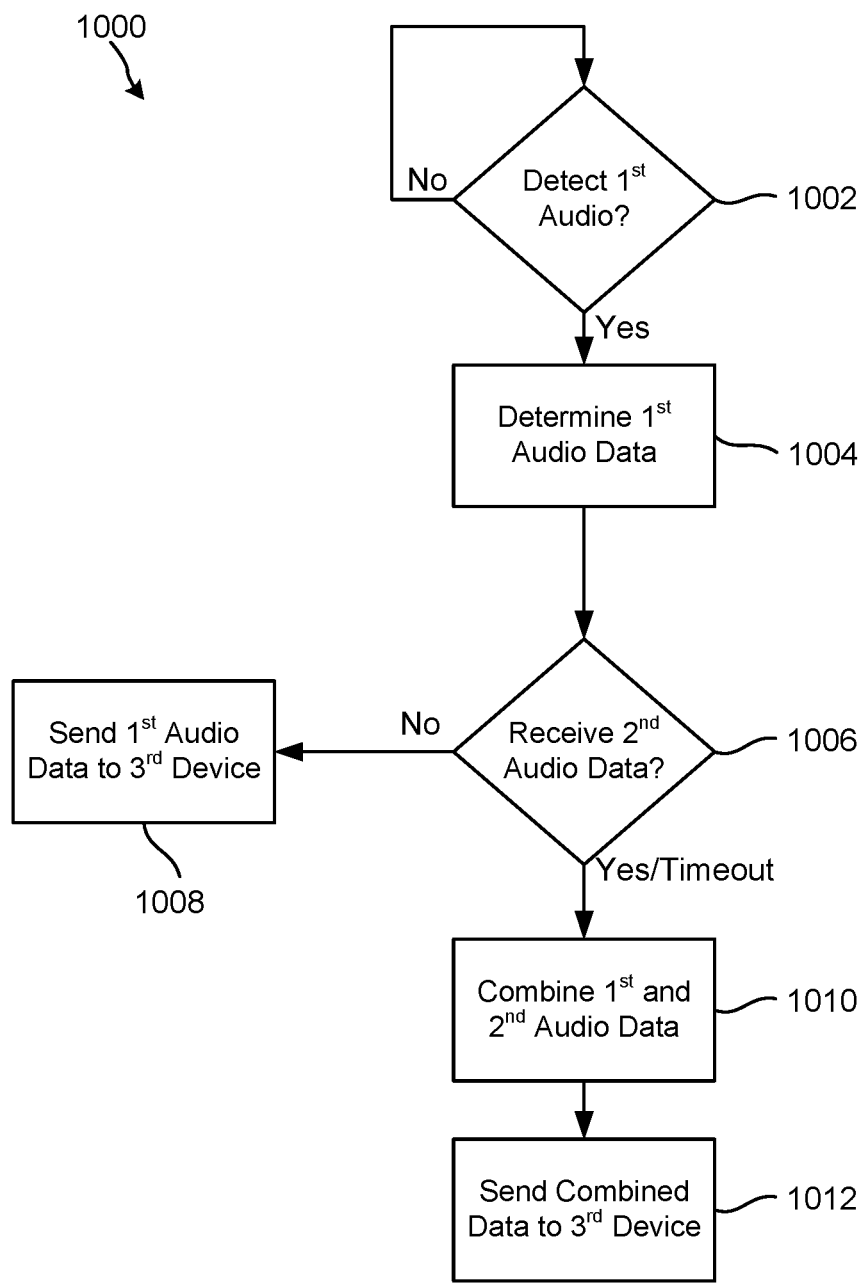

FIGS. 5-9 illustrate various process flows in accordance with the present disclosure. FIG. 5 is a process flow 500 corresponding to an embodiment in which the first device 110a detects speech but the second device 110b does not; FIG. 6 is a process flow 600 corresponding to a similar embodiment in which the second device 110b detects speech but the first device 110a does not; and FIG. 7 is a process flow 700 corresponding to an embodiment in which both the first device 110a and the second device 110b detect speech. FIG. 8 is a process flow 800 corresponding to an embodiment in which both the first and second devices 110a/110b detect speech; the first device 110a selects audio data from one device to send to the third device based on quality metrics. FIG. 9 is a process flow 900 corresponding to a related embodiment in which the second device 110b detects speech and sends audio data to the first device 110a. FIG. 10 is a process flow 1000 corresponding to an embodiment in which the first device 110a sends an audio stream that includes audio data from both devices 110a/110b to the third device 112. Each of these process flows is discussed below in greater detail.

Referring again to FIG. 5, the first device 110a detects (502) first audio 11a by monitoring its microphone 304a. The detection of the audio may include the audio processing component 220 determining first audio data from the first audio 11a; the audio processing component 220 may detect a volume level greater than a threshold in the first audio data. Alternatively or in addition, the VAD component 222 may detect speech in the first audio data. In addition, in some embodiments, the wakeword detection component 222 detects a wakeword in the first audio data. The first device 110a may monitor its microphone 304a continually, periodically, at certain times of day, or at other intervals. In some embodiments, the first device 110a monitors its microphone 304a when instructed to by the third device 112, such as when the user 5 initiates or answers a telephone call. In these embodiments, the first device 110a may instruct the second device 110b to monitor its microphone 304b.

In this process flow 500, the first device 110a does not receive (504) notification from the second device 110b that the second device 110b has detected second audio 11b. For example, the second device 110b may be too far from a source of the first audio 11 to detect it; in other examples, the second device 110b may be nearer a source of noise, such as wind, and may be prevented from detecting the second audio 11b. When the first device 110a detects first audio 11a, it may wait a fixed or variable amount of time before determining that the second device 110b did not receive the second audio 11b; this amount of time may be, for example, 1, 10, 100, or 1000 milliseconds. When the first device 110a does not receive notification from the second device 110b, it sends (506) first audio data to the third device 112. In some embodiments, even if the first device 110a does not receive notification from the second device 110b, it still sends the second audio data to the third device 112 in addition to the first audio data. The first device 110a may use the wakeword detection component 224 to detect a wakeword in the first audio data prior to sending it to the third device 112 and may not send the first audio data if the wakeword is not detected.

FIG. 6 illustrates a process flow 600 in which the first device 110a receives (602) notification from the second device 110b that the second device 110b has detected second audio 11b; the first device 110a does not, however, detect (604) first audio 11a. In some embodiments, the first device 110a waits a fixed or variable amount of time before determining that the first device 110a did not detect the first audio 11a; this amount of time may be, for example, 1, 10, 100, or 1000 milliseconds. The first device 110a receives (606) second audio data from the second device 110b; in some embodiments, the first device 110a first sends a request to the second device 110b for the second audio data. The first device 110a sends (608) the second audio data to the third device 112. In some embodiments, even if the first device 110a does not detect the first audio 11b, it still sends the first audio data to the third device 112 in addition to the second audio data. The first device 110a may use the wakeword detection component 224 to detect a wakeword in the first and/or second audio data prior to sending it to the third device 112 and may not send the first and/or second audio data if the wakeword is not detected.

FIG. 7 illustrates a process flow 700 in which both the first device 110a and the second device 110b detect audio. The first device 110a detects (702) first audio 11a; before, during, or after detecting the first audio 11a, the first device 110a receives (704) notification that the second device 110b detected second audio 11b. The first device 110a may send a request to the second device 110b for the second audio data. The first device 110a sends (706) the first audio data and/or the second audio data to the third device 112. In some embodiments, the first device 110a selects between the first and second audio data based on which came first: detecting the first audio 11b or receiving the notification of detecting the second audio 11b. In other embodiments, as discussed further below, the first device 110a selects between the first and second audio data based on quality metrics associated with each audio data. The first device 110a may use the wakeword detection component 224 to detect a wakeword in the first and/or second audio data prior to sending it to the third device 112 and may not send the first and/or second audio data if the wakeword is not detected.

FIG. 8 illustrates a process flow 800 in which audio data is chosen based on a quality metric; the process flow 800 includes steps 130-142 illustrated in FIG. 1. The first device 110a detects (130) first audio 11a corresponding to an utterance in audio 11 output by a user 5. As mentioned above with reference to FIG. 5, the detection of the audio may include the audio processing component 220 determining first audio data from the first audio 11a; the audio processing component 220 may detect a volume level greater than a threshold in the first audio data. Alternatively or in addition, the VAD component 222 may detect speech in the first audio data. In addition, in some embodiments, the wakeword detection component 222 detects a wakeword in the first audio data. The first device 110a may monitor its microphone 304a continually, periodically, at certain times of day, or at other intervals. In some embodiments, the first device 110a monitors its microphone 304a when instructed to by the third device 112, such as when the user 5 initiates or answers a telephone call. In these embodiments, the first device 110a may instruct the second device 110b to monitor its microphone 304b.

The first device 110a determines (132) first audio data corresponding to the first audio 11a. As mentioned above, the audio-processing component 220 includes a hardware and/or software analog-to-digital converter that converts the analog first audio 11a, as captured by the microphone, into a digital audio signal for inclusion in the first audio data. The analog-to-digital converter may sample the input audio 11a at any of a variety of different sample rates and amplifications. The audio-processing component 220 may further include noise reduction, automatic gain control, or any other such audio processing hardware or software. The audio-processing component 220 may include an encryption and/or compression component to encrypt and/or compress the audio data; the encryption and/or compression may conform to an industry standard, such as Bluetooth.

The first device 110a determines (134) a first quality metric corresponding to the first audio data. As mentioned above, the quality metric may be, for example, a signal-to-noise ratio (SNR) of the audio data, a signal-to-interference-plus-noise ratio (SINR) of the audio data, a perceptual evaluation of audio quality (PEAR) of the audio data, a signal strength of the audio data, or any other such metric. The audio-processing component 220 may compute the first quality metric continuously, at regular intervals, upon detection of input audio, or after the voice-activity detection component 222 detects speech in the input audio. In some embodiments, the audio-processing component 220 computes the first quality metric after a wakeword is detected in the input audio. In these embodiments, the first device 110*a* may send, to the second device 110*b*, a notification representing that the voice-activity detection component 222 detected speech; similarly, the first device 110*a* may receive, from the second device 110*b*, a notification that the voice-activity detection component 222 of the second device 110*b* detected speech. In either case, if at least one of the voice-activity detection components 222 of the first device 110*a* and second device 110*b* detected speech, both the first device 110*a* and the second device 110*b* begin analyzing the audio data for a wakeword.

The first device 110*a* receives (136), from the second device 110*b*, the second quality metric; determination of the second quality metric is discussed in greater detail below with reference to FIG. 9. The first device 110*a* may first send a request to the second device 110*b* for the second quality metric. In some embodiments, if the second quality metric is not received in a fixed or variable amount of time, such as 1, 10, 100, or 1000 milliseconds, the first device 110*a* sends (802) the first audio data to the third device 112.

If the second quality metric is received, the first device 110*a* compares the quality metrics and determines (138) that the second quality metric corresponds to better audio quality than the first quality metric. If the quality metrics are numbers, such as SNRs, the first device 110*a* compares the numbers and determines which is greater. In other embodiments, a lower number indicates a higher quality. The quality metric may be any representation of quality of the audio, however, including some or all of the audio data itself. If the second quality metric does not correspond to better audio quality than the first quality metric, the first device 110*a* sends (802) the first audio data to the third device 112.

The first device 110*a* receives (140), from the second device 110*b*, the second audio data. The first device 110*a* may first send a request to the second device 110*b* to send the second audio data. The second audio data may correspond to an entire utterance or only part of an utterance; in the latter case, the second device 110*b* continues to stream the second audio data to the first device 110*a* until the utterance or series of utterances is complete. The first device 110*a* transmits (142), to the third device 112, output audio data that includes at least a portion of the second audio data. The first device 110*a* may use the wakeword detection component 224 to detect a wakeword in the second audio data prior to sending it to the third device 112 and may not send the second audio data if the wakeword is not detected. At least portion of the first device 110*a* is caused (144) to enter a power-saving mode.

In some embodiments, once the first device 110*a* selects the second audio data as the source of the output audio data, it remains the source until, for example, no further voice or other input is detected by the first device 110*a*, second device 110*b*, or third device 112 or until the device detect no further utterances in the output audio data. In other embodiments, the first device 110*a* continuously monitors (804) the quality of the first and/or second audio data, and, under certain conditions, the first device 110*a* re-selects the first audio data as the source of the output audio data instead of or in addition to the second audio data. In some embodiments, the first device 110*a* continuously monitors the second quality metric of the second audio data; if it falls below a quality threshold and/or a last value determined for the first quality metric, the first device 110*a* selects the first audio data. The first device 110*a* may, before selection of the first audio data, determine the first quality metric of the first audio data and compare it to the second quality metric; if the first quality metric is lower, the first device 110*a* may not select the first audio data. In other embodiments, the first device 110*a* continuously monitors the first quality metric of the first audio data is; if it increases past a quality threshold and/or a last value determined for the second quality metric, the first device 110*a* selects the first audio data. The first device 110*a* may, before selection of the first audio data, determine the second quality metric of the second audio data and compare it to the first quality metric; if the first quality metric is lower, the first device 110*a* may not select the first audio data.

Even if the first device 110*a* determines that the first quality metric became greater than the second quality metric, the first device 110*a* may not select the first audio data until the first quality metric rises a threshold amount past the second quality metric. For example, if the second quality metric is 10.0 and the threshold is 1.0, the first device 110*a* may not select the first audio data until the first quality metric increases to 11.0 or more. In a related embodiment, the first device 110*a* limits the number of switches between the first and second audio data that may occur in a given amount of time by, for example, allowing only a limited number of switches per time period and/or imposing a minimum amount of time between switches. The first device 110*a* may ignore or relax these constrictions under certain circumstances when, for example, the second quality metric has a low value, when the second quality metric decreases rapidly (i.e., the rate of decrease is greater than a threshold rate), and/or when the first quality metric increases rapidly (i.e., the rate of increase is greater than a threshold rate).

In some embodiments, the first device 110*a* stops detecting first audio once it starts sending the second audio to the third device 112 in order to consume less power (i.e., entering a "power-saving state"). For example, the audio-processing component 220, VAD component 222, and/or wakeword detection component 224 may cease monitoring input audio 11*a* captured by the microphone 304*b*. Other circuits and components related to the microphone 304*b* and related components may be similarly powered down. If the first device 110*a* selects the first audio data, it may similarly instruct the second device 110*b* to enter a similar power-saving state.

In some embodiments, after determining that the second quality metric is greater than the first quality metric, the first device 110*a* enters the power-saving state only if certain conditions are first met. For example, the first device 110*a* may enter the power-saving state only if the value of the second quality metric is greater than a threshold, indicating that the second device 110*b* is capturing high-quality audio and that it is thus unlikely that audio captured by the first device 110*a* will be needed. If the value of the second quality metric is less than the threshold, the first device 110*a* may not enter the power-saving state; the second device 110*b* is capturing low-quality audio, so the first device 110*a* remains fully powered-on and capturing its own audio in case the second quality metric worsens and/or the first quality metric improves. In other embodiments, the first device 110*a* enters the power-saving state if the first quality metric is less than a threshold (i.e., the first device 110*a* is capturing low-quality audio), regardless of the value of the second quality metric (again, assuming that the first device 110*a* has already determined that the second quality metric is greater than the first quality metric). In some embodiments, the first device 110*a* enters the power-saving state if the first quality metric is less than a first threshold and if the second quality metric is greater than a second threshold.

The first device 110*a* may leave the power-saving state in any of a number of circumstances. If it is determined that no further audio capture is necessary (when, for example, an audio command and response has ended or when a phone call has ended) by the first device 110*a*, third device 112, or other device or system, the first device 110*a* may leave the power-saving state. In some embodiments, the first device 110*a* leaves the power-saving state if the value of the second quality metric falls below a threshold and/or if the rate of decrease in value of the second quality metric exceeds a threshold. In other embodiments, the first device 110*a* leaves the power-saving state periodically to capture audio and update the first quality metric; the period may be fixed or set dynamically by the value of the second quality metric (i.e., if the second quality metric is low, the first device 110*a* emerges from the power-saving state more frequently).

The preceding paragraphs describe the first device 110*a* entering and leaving the low-power state. One of skill in the art will, however, understand that the second device 110*b* may similarly enter and leave the lower-power state when the first quality metric is initially higher than the second quality metric and the first device 110*a* sends audio to the third device 112.

FIG. 9 illustrates a process flow 900 in which activity on the second device 110*b* is shown; the second device 110*b* includes some or all of corresponding features discussed above with reference to the first device 110*a*. The second device 110*b* detects (902) second audio 11*b* and determines (904) second audio data. Determination of the second audio data may include the second device 110*b* detecting voice and or/detecting a wakeword. The second device 110*b* determines (906) the second quality metric and sends (908) it to the first device 110*a*. The second device 110*b* may receive (910) a request for the second audio data from the first device 110*a*; possibly in response to the request, the second device 110*b* sends (912) the second audio data to the first device 110*a*. If the request is not received within a certain amount of time, the second device 110*b* may send the second audio to the first device 110*a* regardless or return to detecting second audio. Like the first device 110*a*, the second device 110*b* may continuously monitor (914) the second audio 11*b*.

In some embodiments, second device 110*b* performs wakeword detection using the wakeword detection component 224. The second device 110*b* may not send the second quality metric (908), or other indication of detecting the second audio 11*b*, until it detects the wakeword. If the second device 110*b* detects the wakeword, it may send an indication of detection to the first device 110*a* so that the first device 110*a* does not attempt to re-detect the wakeword. By analyzing the second audio data for the wakeword and transmitting it only if the wakeword is detected, the second device 110*b* may conserve battery power and/or bandwidth.

FIG. 10 illustrates a process flow 1000 in which the first device 110*a* sends output audio data that contains some or all of both the first and second audio data to the third device 112. The first device 110*a* detects (1002) the first audio 11*a* and determines (1004) first audio data therefrom. If the first device 110*a* does not receive (1006) second audio data, it sends (1008) the first audio data to the third device. If, however, second audio data is received, the first device 110*a* combines (1010) the first and second audio data. The combining may include bundling the first and second audio data as left and right stereo channels or may include adding or multiplying the first and second audio data. In other embodiments, the combining includes filtering the first and second audio data to increase the volume and/or quality of the input audio 11 and/or decreasing the volume of other sounds in the input audio 11. Once combined, the first device 110*a* sends (1012) the combined audio data to the third device 112.

Figure 11:
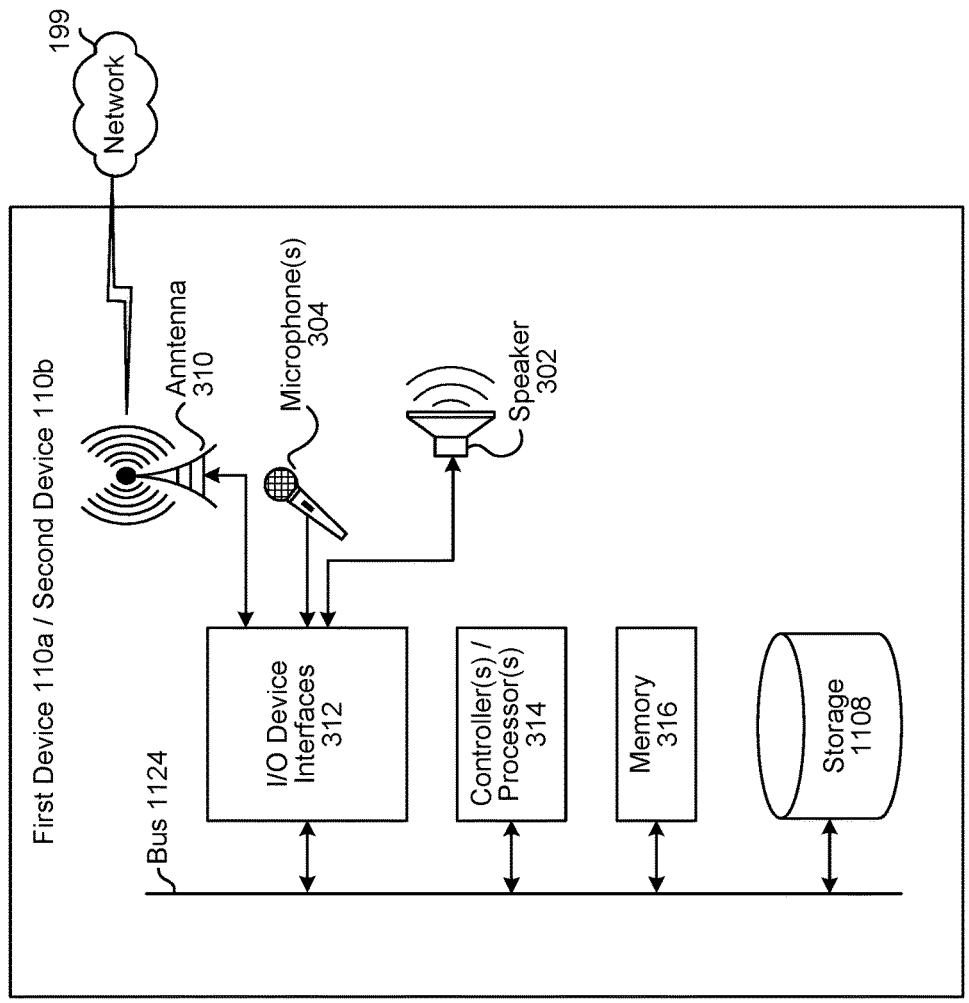
FIGS. 11-13 are block diagrams conceptually illustrating example components of devices according to embodiments of the present disclosure.
Figure 12:
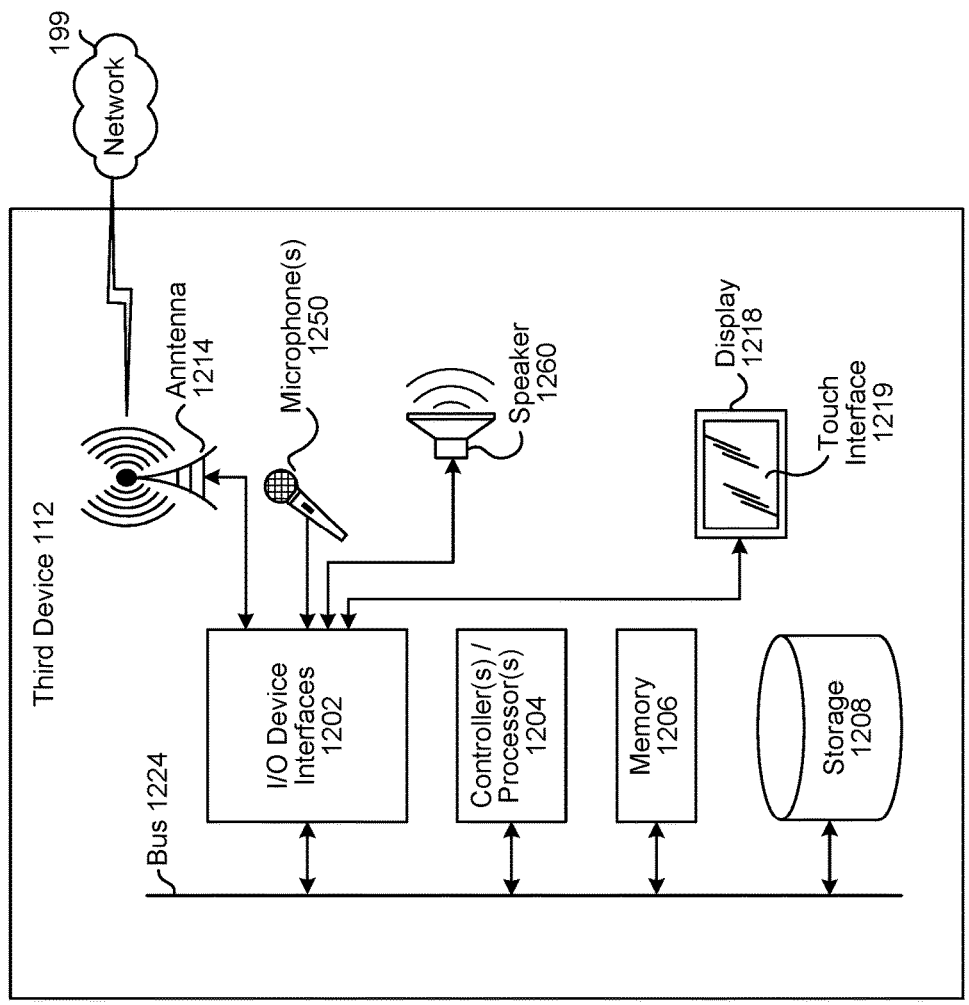
Figure 13:
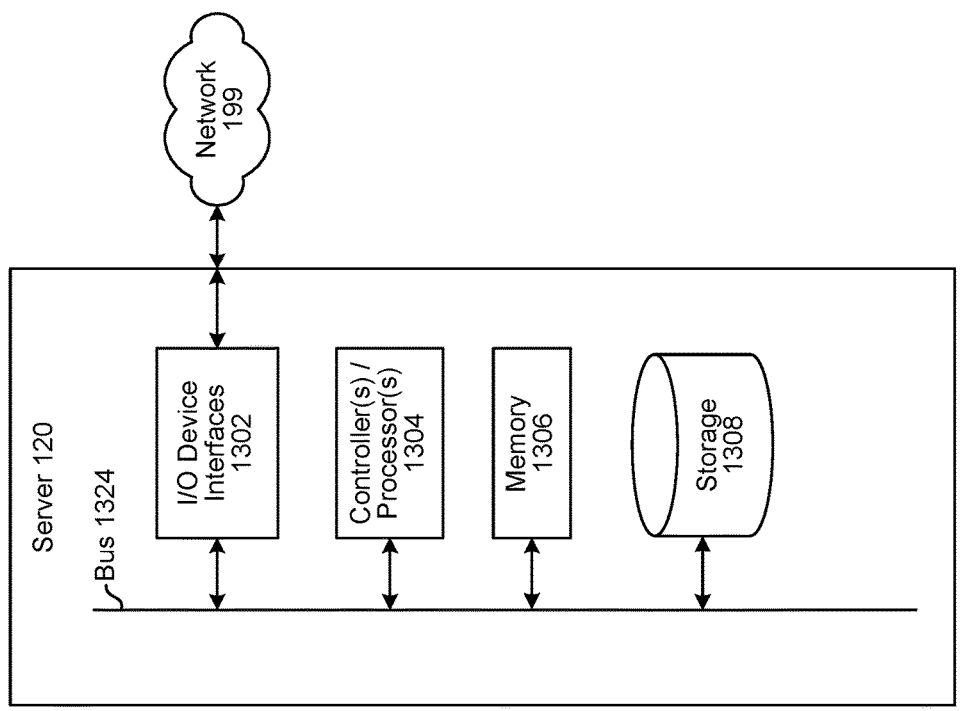

FIG. 11 is a block diagram conceptually illustrating a first device 110*a* or second device 110*b* that may be used with the described system. FIG. 12 is a block diagram conceptually illustrating a third device 112 that may be used with the described system. FIG. 13 is a block diagram conceptually illustrating example components of a remote device, such as a remote server 120, that may assist with ASR, NLU processing, command processing, or the like. Multiple such devices 120 may be included in the system, such as one server(s) 120 for network provisioning, one server(s) for performing ASR, one server(s) 120 for performing NLU, etc. In operation, each of these devices (or groups of devices) may include computer-readable and computer-executable instructions that reside on the respective device (110*a*/110*b*/112/120), as will be discussed further below.

Each of these devices (110*a*/110*b*/112/120) may include one or more controllers/processors (314/1204/1304), which may each include a central processing unit (CPU) for processing data and computer-readable instructions and a memory (316/1206/1306) for storing data and instructions of the respective device. The memories (316/1206/1306) may individually include volatile random-access memory (RAM), non-volatile read only memory (ROM), non-volatile magnetoresistive (MRAM) memory, and/or other types of memory. Each device may also include a data-storage component (1108/1208/1308), for storing data and controller/processor-executable instructions. Each data-storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (312/1202/1302).

Computer instructions for operating each device (110*a*/110*b*/112/120) and its various components may be executed by the respective device's controller(s)/processor(s) (314/1204/1304), using the memory (316/1206/1306) as temporary "working" storage at runtime. A device's computer instructions may be stored in a non-transitory manner in non-volatile memory (316/1206/1306), storage (1108/1208/1308), or an external device(s). Alternatively, some or all of the executable instructions may be embedded in hardware or firmware on the respective device in addition to or instead of software.

Each device (110*a*/110*b*/112/120) includes input/output device interfaces (312/1202/1302). A variety of components may be connected through the input/output device interfaces, as will be discussed further below. Additionally, each device (110*a*/110*b*/112/120) may include an address/data bus (1124/1224/1324) for conveying data among components of the respective device. Each component within a device (110*a*/110*b*/112/120) may also be directly connected to other components in addition to (or instead of) being connected to other components across the bus (1124/1224/1324).

For example, via the antenna 310/1214, the input/output device interfaces 312/1102 may connect to one or more networks 199 via a wireless local area network (WLAN) (such as WI-FI) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the speech processing system may be distributed across a networked environment.

Referring to the device 110a/110b/112 of FIGS. 11 and 12, the device 110a/110b/112 may also include input/output device interfaces 31/1202 that connect to a variety of components, such as an audio output component like a speaker 302/1260 or other component capable of outputting audio. The device 110a/110b/112 may also include an audio capture component which may be, for example, a microphone 304/1250 or array of microphones. The microphone 1150/1250 may be configured to capture audio. The device 110a/110b/112 (using microphone 304/1250, wakeword detection module 224, ASR module 250, etc.) may be configured to determine audio data corresponding to detected audio. The device 110a/110b/112 (using input/output device interfaces 312/1102, antenna 310/1114, etc.) may also be configured to transmit the audio data to server 120 for further processing or to process the data using internal components such as a wakeword detection module 224. As a way of indicating to a user that a communication connection to another device has been created, the device 110a/110b/112 may be configured with a visual indicator, such as an LED or similar component (not illustrated), that may change color, flash, or otherwise provide visual indications by the device 110a/110b/112. The device 112 may include a display 1118, which may comprise a touch interface 1119.

The device 110a/110b may include a wakeword detection component 224. The wakeword detection component 224 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Other techniques known in the art of keyword detection (also known as keyword spotting) may also be used. In some embodiments, the device 110a/110b may be configured collectively to identify a set of the directional audio signals in which the wake expression is detected or in which the wake expression is likely to have occurred.

The wakeword detection component 224 receives captured audio and processes the audio to determine whether the audio corresponds to particular keywords recognizable by the device 110a/110b. The storage 1108 may store data relating to keywords and functions to enable the wakeword detection module 224 to perform the algorithms and methods described above. The locally stored speech models may be pre-configured based on known information, prior to the device 110a/110b being configured to access the network by the user. For example, the models may be language and/or accent specific to a region where the user device is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 110a/110b prior to the user device being delivered to the user or configured to access the network by the user. The wakeword detection component 224 may access the storage 1108 and compare the captured audio to the stored models and audio sequences using audio comparison, pattern recognition, keyword spotting, audio signature, and/or other audio processing techniques.

As noted above, multiple devices may be employed in a single speech processing system. In such a multi-device system, each of the devices may include different components for performing different aspects of the speech processing. The multiple devices may include overlapping components. The components of the first and second devices 110a/110b, third device 112, and server 120, as illustrated in FIGS. 11, 12, and 13, are exemplary, and may be located a stand-alone device or may be included, in whole or in part, as a component of a larger device or system. The concepts disclosed herein may be applied within a number of different devices and computer systems, including, for example, general-purpose computing systems, speech processing systems, and distributed computing environments.

Figure 14:
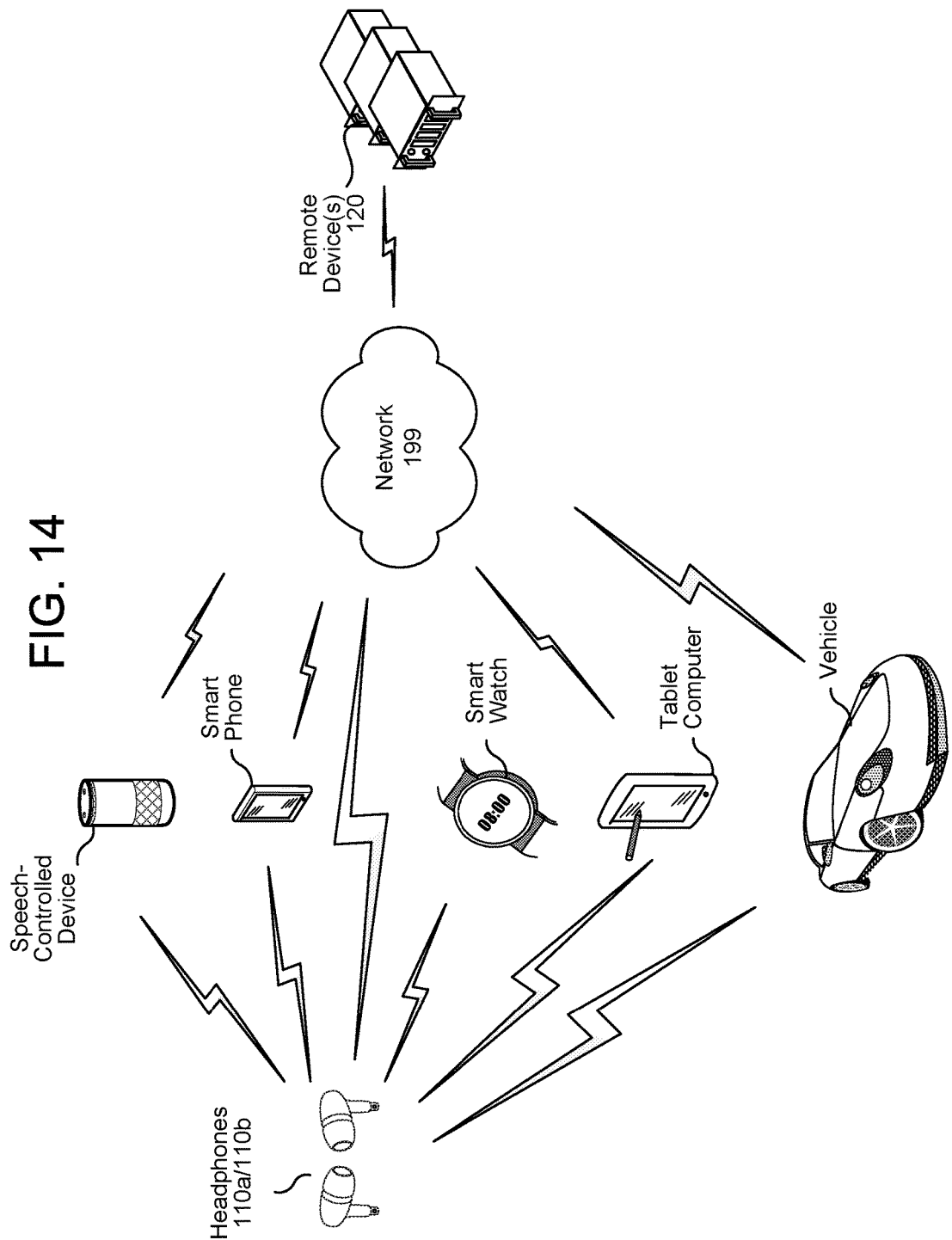
FIG. 14 illustrates an example of a computer network for use with the device provisioning system.

As illustrated in FIG. 14 multiple devices may contain components of the system 100 and the devices may be connected over a network 199. The network 199 may include one or more local-area or private networks and/or a wide-area network, such as the internet. Local devices may be connected to the network 199 through either wired or wireless connections. For example, a speech-controlled device, a tablet computer, a smart phone, a smart watch, and/or a vehicle may be connected to the network 199. One or more remote device(s) 120 may be connected to the network 199 and may communicate with the other devices therethrough. Headphones 110a/110b may similarly be connected to the remote device(s) 120 either directly or via a network connection to one or more of the local devices. The headphones 110a/110b may capture audio using one or more microphones or other such audio-capture devices; the headphones 110a/110b may perform audio processing, VAD, and/or wakeword detection, and the remove device(s) 120 may perform ASR, NLU, or other functions.

The above aspects of the present disclosure are meant to be illustrative and were chosen to explain the principles and application of the disclosure; they are not intended to be exhaustive or to limit the disclosure. Many modifications and variations of the disclosed aspects may be apparent to those of skill in the art. Persons having ordinary skill in the field of computers, wearable devices, and speech processing will recognize that components and process steps described herein may be interchangeable with other components or steps, or combinations thereof, and still achieve the benefits and advantages of the present disclosure. Moreover, it will be apparent to one skilled in the art that the disclosure may be practiced without some or all of the specific details and steps disclosed herein. As the term is used herein, "component" may be interchanged with similar terms, such as "module" or "engine."

Aspects of the disclosed system may be implemented as a computer method or as an article of manufacture, such as a memory device or non-transitory computer readable storage medium. The computer-readable storage medium may be readable by a computer and may comprise instructions for causing a computer or other device to perform processes described in the present disclosure. The computer-readable storage medium may be implemented by a volatile computer memory, non-volatile computer memory, hard drive, solid-state memory, flash drive, removable disk, and/or other media. In addition, components of system may be implemented in firmware and/or hardware, such as an acoustic front end (AFE), which comprises, among other things, analog and/or digital filters (e.g., filters configured as firmware to a digital signal processor (DSP)).

Conditional language used herein, such as, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
    detecting first audio using a primary wireless earbud, wherein the primary wireless earbud:
        comprises a first set of microphones,
        is wirelessly connected to a secondary wireless earbud over a first wireless communication connection, and
        is wirelessly connected to a mobile device over a second wireless communication connection;
    determining, by the primary wireless earbud, first audio data corresponding to the first audio;
    determining, by the primary wireless earbud, that the first audio data corresponds to speech;
    determining, by the primary wireless earbud, a first signal-to-noise ratio (SNR) corresponding to the first audio data;
    receiving, by the primary wireless earbud from the secondary wireless earbud:
        first data corresponding to the secondary wireless earbud detecting speech in second audio data corresponding to second audio detected by the secondary wireless earbud, and
        a second SNR corresponding to the second audio data;
    determining that the second SNR is higher than the first SNR;
    receiving, by the primary wireless earbud from the secondary wireless earbud, at least a portion of the second audio data; and
    sending, by the primary wireless earbud, at least the portion of the second audio data to the mobile device.

2. The method of claim 1, further comprising, prior to sending the second audio data, at least one of:
    determining, by the primary wireless earbud, that the first audio data includes a wakeword; or
    determining, by the secondary wireless earbud, that the second audio data includes the wakeword.

3. A computer-implemented method comprising:
    detecting, by a first earbud of a pair of earbuds, first audio corresponding to a first utterance;
    determining, by the first earbud, first audio data corresponding to the first audio;
    determining, by the first earbud, a first quality metric corresponding to the first audio data;
    receiving, by the first earbud and from a second earbud of the pair of earbuds, a second quality metric corresponding to second audio data corresponding to the first utterance;
    determining that the second quality metric corresponds to higher audio quality than the first quality metric;
    receiving, by the first earbud and from the second earbud, at least a portion of the second audio data;
    sending, by the first earbud and to a user device, output audio data comprising at least the portion of the second audio data; and
    causing at least a portion of the first earbud to enter a power-saving state.

4. The method of claim 3, further comprising:
    receiving, by the first earbud from the second earbud, first data corresponding to the second earbud detecting second audio corresponding to the second audio data; and
    sending, from the first earbud to the second earbud, a command to send the second audio data.

5. The method of claim 3, further comprising, prior to sending the output audio data:
    processing, by the first earbud, the first audio data to detect a representation of a wakeword; and
    receiving, from the second earbud, an indication of detection of the wakeword by the second earbud.

6. The method of claim 3, further comprising:
    determining that the first quality metric is greater than a threshold; and
    configuring the output audio data to further comprise at least a portion of the first audio data.

7. The method of claim 3, further comprising:
    determining, using the first earbud, noise data common to the first audio data and the second audio data; and
    removing the noise data from the first audio data and the second audio data to determine filtered audio data,
    wherein the output audio data comprises the filtered audio data.

8. The method of claim 3, further comprising:
    determining that the first quality metric is lower than a threshold; and
    causing at least the portion of the first earbud to enter the power-saving state based at least in part on the first quality metric being lower than the threshold.

9. The method of claim 3, wherein causing at least the portion of the first earbud to enter the power-saving state further comprises at least one of:
    causing a voice-activity detection component to cease analyzing the first audio data; or
    causing a wakeword detection component to cease analyzing the first audio data.

10. The method of claim 3, wherein determining the first audio data further comprises at least one of:
    determining, by the first earbud, the first audio data comprises a voice; or
    receiving, by the first earbud from the second earbud, first data corresponding to the second earbud determining the second audio data comprises the voice.

11. The method of claim 10, wherein determining the second quality metric corresponds to higher audio quality than the first quality metric further comprises at least one of:
   determining, by the first earbud, that the first audio data comprises a wakeword; or
   receiving, by the first earbud from the second earbud, second data corresponding to the second earbud determining the second audio data comprises the wakeword.

12. A system comprising:
   at least one processor; and
   at least one memory including instructions that, when executed by the at least one processor, cause the system to:
      detect, by a first earbud, first audio corresponding to an utterance,
      determine, by the first earbud, first audio data corresponding to the first audio;
      determine, by the first earbud, a first quality metric corresponding to the first audio data,
      receive, by the first earbud and from a second earbud, a second quality metric corresponding to second audio data corresponding to the first utterance,
      determine that the second quality metric corresponds to higher audio quality than the first quality metric,
      receive, by the first earbud from the second earbud, at least a portion of the second audio data,
      send transmit, by the first earbud to a user device, output audio data comprising at least the portion of the second audio data, and
      cause at least a portion of the first earbud to enter a power-saving state.

13. The system of claim 12, further comprising additional instructions that, when executed by the at least one processor, further cause the system to:
   receive, by the first earbud from the second earbud, first data corresponding to the second earbud detecting second audio corresponding to the second audio data; and
   send, from the first earbud to the second earbud, a command to send the second audio data.

14. The system of claim 12, further comprising additional instructions that, when executed by the at least one processor, further cause the system to:
   process, by the first earbud, the first audio data to detect a representation of a wakeword; and
   receive, from the second earbud, an indication of detection of the wakeword by the second earbud.

15. The system of claim 12, further comprising additional instructions that, when executed by the at least one processor, further cause the system to:
   determine that the first quality metric is greater than a threshold; and
   configure the output audio data to further comprise at least a portion of the first audio data.

16. The system of claim 12, further comprising additional instructions that, when executed by the at least one processor, further cause the system to:
   determine, using the first earbud, noise data common to the first audio data and the second audio data; and
   remove the noise data from the first audio data and the second audio data to determine filtered audio data,
   wherein the output audio data comprises the filtered audio data.

17. The system of claim 12, further comprising additional instructions that, when executed by the at least one processor, further cause the system to:
   determine that the first quality metric is lower than a threshold; and
   cause at least the portion of the first earbud to enter the power-saving state based at least in part on the first quality metric being lower than the threshold.

18. The system of claim 12, further comprising additional instructions that, when executed by the at least one processor, further cause the system to do at least one of:
   cause a voice-activity detection component to cease analyzing the first audio data; or
   cause a wakeword detection component to cease analyzing the first audio data.

19. The system of claim 12, further comprising additional instructions that, when executed by the at least one processor, further cause the system to do at least one of:
   determine, by the first earbud, the first audio data comprises a voice; or
   receive, by the first earbud from the second earbud, first data corresponding to the second earbud determining the second audio data comprises the voice.

20. The system of claim 19, further comprising additional instructions that, when executed by the at least one processor, further cause the system to do at least one of:
   determine, by the first earbud, that the first audio data comprises a wakeword; or
   receive, by the first earbud from the second earbud, second data corresponding to the second earbud determining the second audio data comprises the wakeword.

* * * * *